United States Patent [19]

Massey

[11] 3,959,228

[45] May 25, 1976

[54] LOW CARBOXYL HIGH MOLECULAR WEIGHT POLYESTERS

[75] Inventor: Freddie L. Massey, Akron, Ohio

[73] Assignee: The Goodyear Tire & Rubber Company, Akron, Ohio

[22] Filed: Mar. 17, 1975

[21] Appl. No.: 558,867

[52] U.S. Cl. .............................. 260/75 T; 260/75 N
[51] Int. Cl.$^2$ .................. C08G 63/46; C08G 63/68
[58] Field of Search ............. 260/75 T, 75 M, 75 N

[56] References Cited
UNITED STATES PATENTS

| | | | |
|---|---|---|---|
| 3,470,136 | 9/1969 | McClendon et al. | 260/75 T |
| 3,507,837 | 4/1970 | Hidinger | 260/75 T X |
| 3,817,945 | 6/1974 | Oberth et al. | 260/78.4 D |

FOREIGN PATENTS OR APPLICATIONS

| | | |
|---|---|---|
| 1,520,590 | 11/1971 | Germany |

*Primary Examiner*—Murray Tillman
*Assistant Examiner*—W. C. Danison, Jr.
*Attorney, Agent, or Firm*—F. W. Brunner; J. P. Ward

[57] ABSTRACT

There is disclosed low carboxyl high molecular weight polyester compositions comprising the product of the reaction of an aziridine compound with the polycondensation product derived from the reaction of a diol and a dicarboxylic acid or $C_1$ to $C_4$ alkyl ester thereof and processes for preparing said compositions.

10 Claims, No Drawings

LOW CARBOXYL HIGH MOLECULAR WEIGHT POLYESTERS

The present invention relates to low carboxyl high molecular weight polyester compositions and their methods of preparation. More particularly, the invention relates to polyester compositions prepared by reacting an aziridine compound with the polycondensation product derived from the reaction of a diol with a dicarboxylic acid or $C_1$ to $C_4$ alkyl ester thereof.

Fibers, films and other extruded or molded articles manufactured from high molecular weight linear polyesters, such as polyethylene terephthalate, have found wide acceptance in recent years in a variety of commercial applications. However, a limiting factor on an even greater use of these polyesters has been their susceptibility in various degrees to degradation due to thermal and/or hydrolytic attack. It is well known that, in the main, this degradation takes place at the free carboxyl end groups of the polyesters. The higher the number of carboxyl end groups the greater the degradation of the polyester and the shorter the service life of the article produced from these polyesters. Many solutions have been suggested for decreasing the carboxyl end group concentration of polyesters. Generally these solutions have involved inter alia, reacting the carboxyl end groups with various known reactive materials which render said polyesters relatively stable against the various degradative processes described above. Examples of reactive materials which are known to react with the free carboxyl end groups include epoxides, diisocyanates and polymeric carbodiimides. However, many of the materials which give the best results are the slowest to react with the carboxyl end groups and their use has thus engendered increased costs due to increased expenditures in time, equipment, catalysts, etc. to ensure complete reaction.

A class of materials has now been found which undergo rapid reaction with the free carboxyl end groups of polyesters and which materials render polyesters stable against thermal and/or hydrolytic attack. This class of materials is known as aziridines. Accordingly, the present invention is directed to low carboxyl, high molecular weight linear polyester compositions comprising the product of the reaction of (1) an aziridine compound of the formula

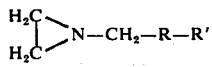

where R is selected from the group consisting of straight and branched chain alkylene radicals containing from 0 to 10 carbon atoms and preferably from 2 to 9 carbon atoms, and R' is selected from the group consisting of methyl, cycloalkyl and aryl radicals with (2) the polycondensation product derived from the reaction of (A) at least one diol of the formula $HO(CH_2)_nOH$ where n is an integer ranging from 2 to 10 and (B) at least one dicarboxylic acid or $C_1$ to $C_4$ alkyl ester thereof. The invention is further directed to a process for preparing said polyester compositions comprising adding to and reacting with a polycondensation product derived from the reaction of at least one diol of the formula $HO(CH_2)_nOH$ where n is an integer ranging from 2 to 10 and at least one dicarboxylic acid or $C_1$ to $C_4$ alkyl ester thereof and an aziridine compound of the above formula. As employed throughout this specification the term "low carboxyl" has reference to polyesters having carboxyl numbers of from 0 to 10 equivalents per million grams of polyester or, expressed another way, from 0 to 10 free carboxyl end groups per million grams of polyester. "High molecular weight" is defined as a polyester having an intrinsic viscosity (I.V.) of at least 0.4 and preferably at least 0.6 as measured in a 60/40 phenol/tetrachloroethane mixed solvent at 30°C. and "polyester" is defined as including both homopolyesters and copolyesters.

The reaction of an aziridine compound corresponding to the above formula with the free carboxyl end groups of the polycondensation product of a diol and a dicarboxylic acid or $C_1$ to $C_4$ alkyl ester thereof, i.e., a polyester, is very rapid. In fact, the rate of reaction between the aziridine compound and the free carboxyl end groups, as determined in laboratory tube reactor evaluations, was found to be almost instantaneous. No catalysts were required and no volatile reaction by-products were formed. Representative examples of but a few of the aziridine compounds which undergo rapid reaction with polyesters to provide the low carboxyl polyester of the present invention include ethyl ethyleneimine, n-propyl ethyleneimine, n-butyl ethyleneimine, heptyl ethyleneimine, cyclohexylethyl ethyleneimine, cyclohexylbutyl ethyleneimine, benzyl ethyleneimine, phenylethyl ethyleneimine and the like.

The aziridine compounds can be added to polyesters either after completion of the polycondensation of the reaction product of the diol and the carboxylic acid or $C_1$ to $C_4$ alkyl ester thereof or during the conversion of said polyesters from resin to finished products such as, for example, fibers and films, or in other words, during the spinning or extrusion of said polyester resins. However, because of the rapid reaction between the aziridine compounds as described herein with the free carboxyl end groups of the polyester being treated it is most advantageous to add the aziridine compound to the polyester during the spinning or extruding of said polyester. The amount of aziridine compound added to the polyester will range from about 0.02 to about 1.00 percent by weight of the polyester and is determined by the initial carboxyl number of the polyester to which it is added. A more preferred range is from about 0.10 to about 0.50 percent by weight. Amounts of aziridine compound within these ranges will produce polyesters having a carboxyl end group concentration ranging from 0 to 10 carboxyl end groups per million grams of polyester.

As disclosed hereinabove, the term "polyester" is defined as including both homopolymers and copolyesters. More particularly, this term as used herein includes all linear polyesters and copolyesters based on dicarboxylic acids or the $C_1$ to $C_4$ alkyl esters thereof and diols of the series $HO(CH_2)_nOH$ where n is an integer ranging from 2 to 10. The dicarboxylic acids which can be most advantageously employed include aromatic dicarboxylic acids such as terephthalic acid, isophthalic acid, diphenyl-p,p'-dicarboxylic acid and the 2,6- and 2,7-naphthalene dicarboxylic acids. The aromatic dicarboxylic acids can be used as such or in the form of their $C_1$ to $C_4$ alkyl esters such as the dimethyl, diethyl, dipropyl and dibutyl alkyl esters. Mixtures of these acids or their esters can also be employed.

Furthermore, the present invention is also applicable to polyesters prepared from the reaction of mixtures of one or more of the above described aromatic dicarboxylic acids or esters thereof with one or more saturated aliphatic dicarboxylic acids containing from 3 to 10 carbon atoms or the $C_1$ to $C_4$ esters thereof and one or more of the diols described below. Representative examples of suitable saturated aliphatic dicarboxylic acids containing from 3 to 10 carbon atoms include malonic acid, succinic acid, glutaric acid, adipic acid, pimelic acid, suberic acid, azelaic acid and sebacic acid. Representative examples of the $C_1$ to $C_4$ alkyl esters of the saturated aliphatic dicarboxylic acids described above include the dimethyl, diethyl, dipropyl and dibutyl esters.

Diols of the series $HO(CH_2)_nOH$ which are useful in preparing the above described polyesters include ethylene glycol, propylene glycol, tetramethylene glycol, neopentyl glycol, hexamethylene glycol, decamethylene glycol and the like. In addition, diols such as 1,4-dimethylol cyclohexane have also been found to be useful. The present invention is also applicable to polyesters prepared from mixtures of two or more of the above described acids or their esters and diols. The preferred polyesters to which the present invention is applicable, however, are those in which at least 80 percent of the acid component consists of units of terephthalic acid and at least 80 percent of the diol component consists of units of ethylene glycol.

The above described polyesters can be prepared by any of the polyester forming processes known in the art. Thus, the polyesters can be prepared either by the esterification-polycondensation process employing a dicarboxylic acid and a diol or the polyesters can be prepared by the transesterification-polycondensation process whereby the $C_1$ to $C_4$ alkyl ester of the dicarboxylic acid is reacted with a diol to form the corresponding diglycol ester followed by polycondensation of the diglycol ester. The conditions of temperature, pressure, catalyst, etc. involved in carrying out the esterification or transesterification and polycondensation reaction are all well known in the art (see, for example, U.S. Pat. No. 3,756,866).

The following examples illustrate the invention. All parts and percentages are by weight unless otherwise indicated.

EXAMPLE I

In a laboratory tube reaction 70.0 grams of polyethylene terephthalate with an initial I.V. of 0.626 and a carboxyl number of 21 equivalents per million grams of polyester (eq./$10^6$ g.) was melted at a temperature of 275°C. under a nitrogen atmosphere. Once the sample was completely melted a 10 gram sample was removed for later characterization and 0.203 gram of a 70 percent solids solution of n-butyl ethylenimine in dioxane added to the remaining 60 grams of polyester. Thus, the polyester contained 0.24 percent of n-butyl ethyleneimine (which includes a 10 percent excess). The polyester was allowed to react with the n-butyl ethyleneimine compound at 275°C. and under nitrogen atmosphere with constant stirring for five minutes. At the end of this time the sample was cooled to a solid and characterized. The sample to which the n-butyl ethyleneimine was added was found to have a carboxyl number of 4 eq./$10^6$g. while the 10 gram sample which was not reacted with any n-butyl ethyleneimine was found to have a carboxyl number of 27 eq./$10^6$ g.

EXAMPLE II

Polyethylene terephthalate with an initial I.V. of 1.07 and a carboxyl number of 17 eq./$10^6$ g. of polymer was treated with n-butyl ethyleneimine during spinning on a one inch extruding unit. A Howard Apparatus Compact Infusion pump was used to deliver 10.80 grams per hour (or 0.2 weight percent) of the aziridine to 5448 grams per hour of polymer. A comparative example not containing the aziridine compound was also carried out under the same spinning conditions. The spun yarn produced in the comparative example was determined to possess a carboxyl number of 23 eq./$10^6$ g. while the spun yarn treated with the n-butyl ethyleneimine was determined to possess a carboxyl number of 9 eq./$10^6$ g.

While certain representative embodiments and details have been shown for the purpose of illustrating the invention, it will be apparent to those skilled in this art that various changes and modifications may be made therein without departing from the spirit or scope of the invention.

What is claimed is:

1. Low carboxyl, high molecular weight polyester compositions comprising the product of a reaction of about 0.02 to about 1.00 percent by weight of the polyester of (1) an aziridine compound of the formula

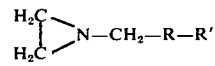

where R is selected from the group consisting of straight and branched chain alkylene radicals containing from 0 to 10 carbon atoms and R' is selected from the group consisting of methyl, cycloalkyl and aryl radicals with (2) a molten polycondensation saturated polyester having an intrinsic viscosity of at least 0.4 as measured in a 60/40 phenol/tetrachloroethane mixed solvent at 30°C being derived from a reaction of (A) at least one diol of the formula $HO(CH_2)_nOH$ where n is an integer ranging from 2 to 10 and (B) at least one dicarboxylic acid or $C_1$ to $C_4$ alkyl ester thereof.

2. Compositions according to claim 1 wherein R in the formula representing the aziridine compound is an alkylene radical containing from 2 to 9 carbon atoms and R' is methyl radical.

3. Compositions according to claim 1 wherein the polycondensation product is derived from ethylene glycol and terephthalic acid.

4. Compositions according to claim 1 wherein the polycondensation product is derived from ethylene glycol and dimethyl terephthalate.

5. Compositions according to claim 2 wherein R is ethylene radical and R' is methyl radical.

6. Compositions according to claim 1, wherein the aziridine compound is reacted with the polycondensation product of (A) and (B) in an amount ranging from 0.10 to 0.50 percent by weight of the polycondensation product.

7. A process for preparing low carboxyl, high molecular weight polyester compositions comprising adding to and reacting with a molten polycondensation saturated polyester having an intrinsic viscosity of at least 0.4 as measured in a 60/40 phenol/tetrachloroethane mixed solvent at 30°C, being derived from a diol of the formula $HO(CH_2)_nOH$ where n is an integer ranging from 2 to 10 and (B) a dicarboxylic acid or $C_1$ to $C_4$ alkyl ester thereof, from 0.02 to 1.00 percent by weight based on said polycondensation product of an aziridine compound of the formula

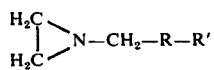

where R is selected from the group consisting of straight and branched chain alkylene radicals containing from 0 to 10 carbon atoms and R' is selected from the group consisting of methyl, cycloalkyl and aryl radicals.

8. A process according to claim 7 wherein the aziridine compound is added to and reacted with the molten polycondensation product of (A) and (B) during the spinning or extrusion of said polycondensation product into fiber or film.

9. A process according to claim 7 wherein the aziridine compound is added to and reacted with the molten polycondensation product of (A) ethylene glycol and (B) and terephthalic acid.

10. A process according to claim 7 wherein the aziridine compound is added to and reacted with the molten polycondensation product of (A) ethylene glycol and (B) dimethyl terephthalate.

* * * * *